May 31, 1966     E. JABLONSKI ETAL     3,254,228
MEASURING DEVICE

Filed Nov. 15, 1962     2 Sheets-Sheet 1

WITNESSES

INVENTORS
Eugene Jablonski &
John A. Redmond
BY
AGENT

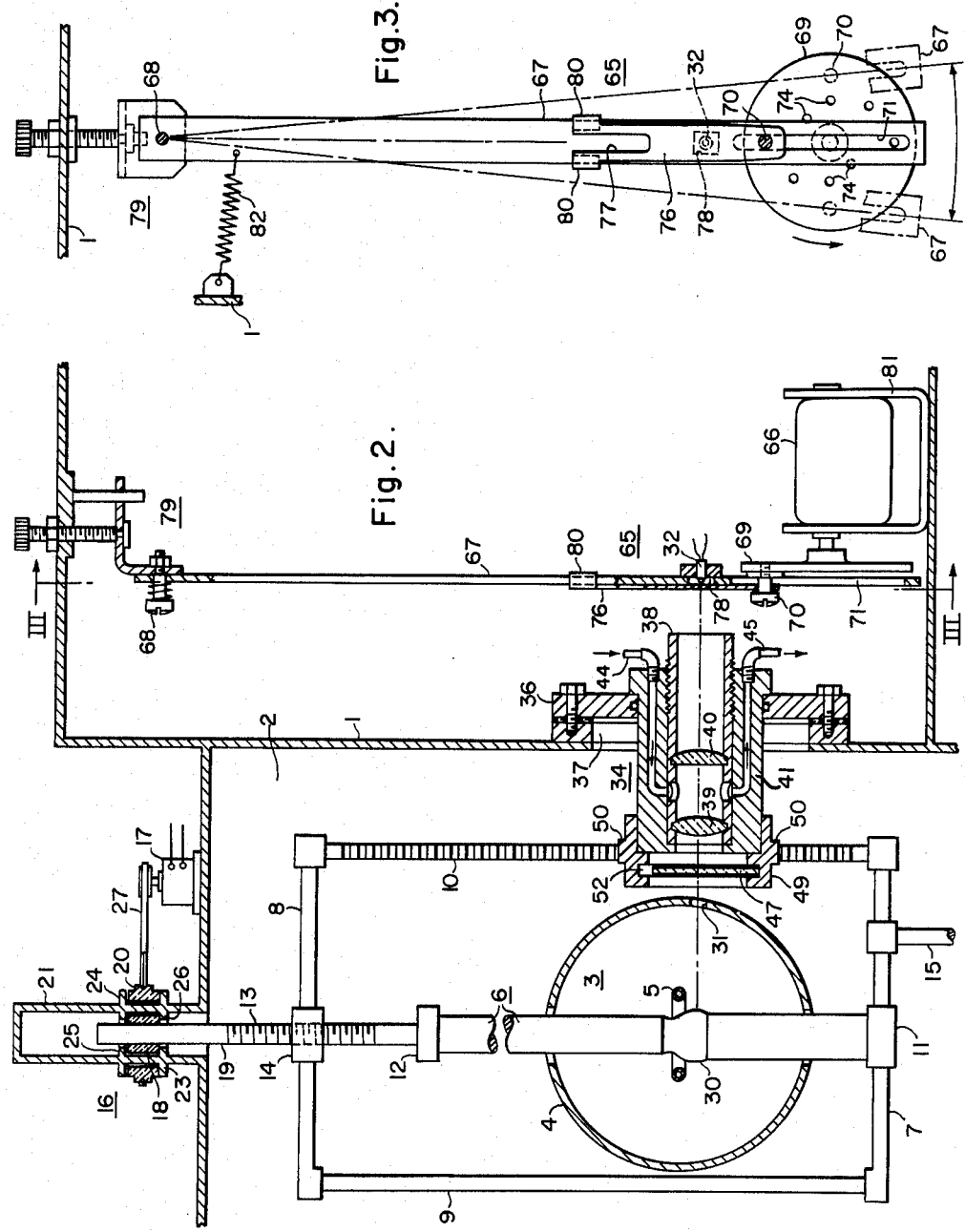

United States Patent Office 3,254,228
Patented May 31, 1966

3,254,228
MEASURING DEVICE
Eugene Jablonski, Baltimore, and John A. Redmond, Ellicott City, Md., assignors to Westinghouse Electric Corporation, Pittsburgh, Pa., a corporation of Pennsylvania
Filed Nov. 15, 1962, Ser. No. 237,867
5 Claims. (Cl. 250—235)

This invention relates to a device for measuring the dimension of an object, and more particularly to a signal-producing photoelectric measuring device for accurate measurement of the dimension of a light-contrasted object, or a luminous object, such as the diameter of the molten zone of a rod-shaped material, a semiconductor rod, for example, during floating zone melting, for purposes of controlling the rod diameter during scanning movement of the molten zone along the rod.

Apparatus has been heretofore available for such signal-producing dimension measuring, but it is a prime object of the present invention to provide a means whereby such measuring may be obtained with a higher degree of accuracy and/or simplicity of the performing means, than such previous apparatus.

In accordance with general features of the invention, an image of the dimensionally-pertinent area of the object is produced and such image is relatively scanned by photoelectric means to produce an electrical pulse signal of a length in time equal to the dimension of the image. By the creation of the image of the object and the scanning of the image, rather than the scanning of the object itself, high degrees of measuring accuracy and simplicity of construction are afforded. For example, the image can represent an enlargement of the measured object, in behalf of increased accuracy where image contrast is compatible with the sensitivity of the photoelectric means; the image can be reduced in size for increased contrast where necessary; and the image can be optically transmitted to sites which may be particularly suited for location of the photoelectric means. Furthermore, scanning an image rather than scanning the object affords opportunity for effecting such scanning either by movement of the image, or by movement of the photoelectric means, thereby broadening the field of application to suit various environmental conditions.

Other advantages and objects of the invention will become apparent from the following detailed description when taken in connection with the accompanying drawings, in which:

FIG. 2 is a front elevation view substantially in cross-section showing one embodiment of the invention as incorporated in floating-zone melting equipment;

FIG. 3 is an elevation view taken in the direction of arrow III in FIG. 2;

Figure 1:
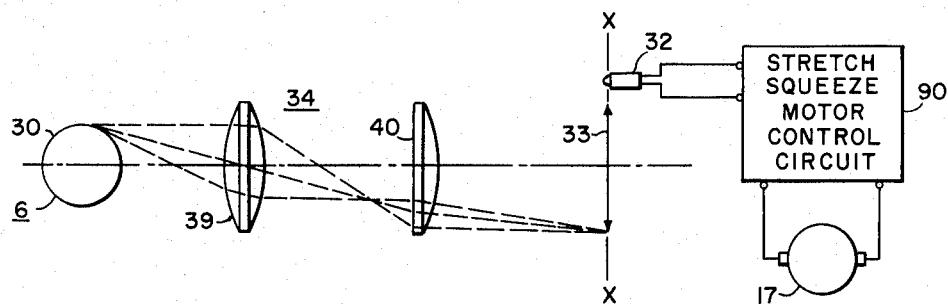
FIGURE 1 is a schematic representation in plan view of the apparatus of the present invention.

Referring to FIG. 2, the floating-zone melting apparatus with which the invention is associated herein may be of the type shown and described in copending patent application Serial No. 219,957, filed August 28, 1962 by Eugene Jablonski and John A. Redmond, assigned to the assignee of the present application. Such zone melting equipment comprises an evacuable enclosure 1 having an interior 2 in which is located a heating chamber 3 defined by a cylindrical shield 4 encircling a fixed induction heating coil 5 through which the rod-like material 6 to be zone melted passes vertically. The rod-like material or workpiece 6 is supported for scanning movement vertically through the heating coil 5 by a frame-like construction which includes vertically-spaced-apart horizontally-extending members 7 and 8 which are joined by horizontally-spaced-apart vertical members 9 and 10. The bottom of the workpiece 6 is supported by a workpiece clamp 11 which is carried by the horizontal frame member 7, and the upper end of the workpiece 6 is held in a clamp 12 which is carried by the upper horizontal frame member 8 through the medium of a stretch-squeeze screw member 13 in screw-threaded engagement with a nut 14 attached to member 8. Vertical movement of the workpiece-holding frame construction is affected through the medium of a vertically movable rod 15 which is operatively connected to the lower horizontal frame member 7. Such vertical movement of the frame construction carries with it the workpiece 6 via clamps 11 and 12, the nut 14, and the screw 13. To effect relative degrees of separation between the upper and lower workpiece holders 11 and 12, and thereby effect stretching or squeezing of the workpiece 6, such as to obtain accurate control of the diameter of the workpiece 6 as same is melted progressively along its length in a narrow zone, the screw member 13 is rotated relative to the support frame through the medium of a magnetic rotary coupling 16 and a reversible stretch-squeeze motor 17. The magnetic rotary coupling comprises an inner cylindrical magnet 18 which is retained in a longitudinal position with respect to the direction of extension of the screw member 13 and is slidable relative to a square shaft portion thereof for torque coupling therewith. For effecting turning movement of the inner rotating magnet member 18, an outer cylindrical magnet member 20 encircles a cylindrical portion 21 of the housing 1 and is coupled magnetically to inner member 18, the material of the cylindrical portion 21 of the housing 1 being of non-ferromagnetic material, such as stainless steel. The outer magnetic coupling member 20 is retained in place by annular retaining shoulders 23 and 24 associated with housing portion 21. Similar shoulders 25 and 26 within housing portion 21 serve to retain the inner magnetic coupling member 18. In actual practice, thrust bearing means are employed, but insofar as the present invention is concerned such details are of no significance herein. A V-belt 27 couples the outer magnet member 20 to the stretch-squeeze motor 17.

To permit observation of the molten zone 30 of the workpiece 6, a slot 31 is provided in the cylindrical shield 4 at one side of such zone. In accord with novel features of the present invention, the slot 31 extends in a horizontal direction, i.e. perpendicular to the plane of the drawing as observed in FIG. 2, and a magnified image 33 of a narrow diameter-wise section of the molten zone is created in a focal plane X—X, which image is scanned by a photocell 32 which reciprocates back and forth across such image, image 33 in FIG. 1, at regular intervals.

Referring to FIGS. 1 and 2, the enlarged image 33 is produced by a lens system 34 which is mounted on the housing 1 through the medium of an adapter ring 36 encircling a reinforced opening 37 in the wall of the housing. Opening 37 is aligned with the slot 31 in the shield 4, and the lens system 34 includes an inner barrel 38 in which are mounted optical elements 39 and 40 constructed and arranged to provide the proper image 33. Lens element 39 may be of double convex configuration, while lens element 40 may be plano-convex, and each may be of compound construction according to standard optical practice. The inner barrel 38 is in screw-threaded attachment with an outer cylindrical member 41 which is sealingly mounted in the adaptor ring 36 and projects into the interior of the housing 1. By rotational adjustment of the barrel 38 within the member 41, focusing of the magnified image 33 of the molten zone 30 of the workpiece 6 may be obtained, according to the size of the image desired and the location of the focal plane. To protect the lens elements 39 and 40 from heat damage by the radiation from the molten zone 30, these elements are water-cooled via conduits 44 and 45 extending axially through the member 41 and opening radialwise into the interior of the barrel 38 between such elements.

To protect the innermost lens element 39 from becoming coated with materials from the molten zone 30, an outer glass shield 47 is provided adjacent to the slot 31 in the shield 4. To distribute any such deposit over the entire area of the glass shield 47, which is disc-shaped, such element 47 is rollingly mounted in a ring member 49 which rotates about the member 41. Rotation of the ring member 49 being effected by the vertical member 10 of the workpiece-carrying frame construction, which member 10 is in the form of a rack having teeth in engagement with gear teeth 50 encircling the outer portion of ring 49. Vertical movement of the frame construction including vertical rack member 10 during movement of the workpiece 6 through the induction heating coil 5 automatically effects corresponding rotation of the ring member 49 around member 41, which causes the disc-shaped glass shield 47 to roll along the bottom of an annular retaining groove 52 formed in ring member 49. The diameter of the disc-shaped glass shield 47 is less than the diameter of the groove 52 to permit such shield to be replaced with relative ease by merely lifting same free of the bottom portion of the groove and outwardly through the end of member 49. In this fashion deposition on the face of the glass shield 47 does not take the pattern of the elongated slot 31 in the shield 4, but rather is distributed evenly over the entire face of shield 47 and therefore extends the period of time before such shield must be replaced.

Figure 4:
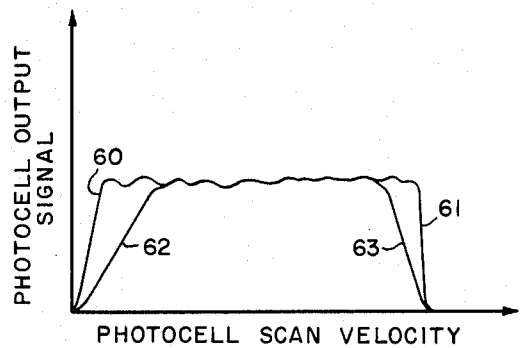
FIG. 4 is a diagram relating to the shape and characteristics of the electrical pulse produced by the scanning photoelectric means embodied in the invention.

In accord with one embodiment of the invention the photocell 32 scans the magnified luminous image 33 of the molten zone 30 of the workpiece 6 at a relatively rapid repetition rate, such as 100 times per minute, to assure that the molten-zone-width information is sampled with sufficient frequency to assure opportunity for frequent regulation in behalf of maintaining uniformity of the rod diameter during its scansion relative to the heating coil 5, and to assure non-blurring of such image during rotation of the workpiece at relatively slow rates (10 r.p.m.) should wobble of the molten zone at such slow rate occur. Each scanning movement of the photocell 32 across the luminous image 33, however, is done at a variable rate which becomes increasingly slower as the photocell moves from the center of such image to just beyond opposite outer ends of such image. The effect of this as illustrated in FIG. 4 is to give a steeper entrance and exit slope 60 and 61 to the output signal pulse from the photocell during a given scan than the more shallow entrance and exit slopes 62 and 63 which appear in such output pulse when the photocell enters and leaves the luminous image during a given scan at a faster rate, for a given photocell. The squareness of the shape of the photocell output pulse during a given scan is critical from the point of view of accuracy of information represented by the time length of such pulse.

Referring to FIGS. 2 and 3, this rapid scan movement of the photocell 32 with slow entry and exit into and out of the luminous image 33 is effected by a simple-harmonic-motion mechanism 65 which is operated at a constant rate by a synchronous motor 66. The mechanism 65 includes a pendulum arm 67 which is pivotally mounted by a pin 68 at its upper end and which carries the photocell 32 adjacent to its lower end. The pendulum arm 67 is oscillated back and forth about the pin 68 by the synchronous motor 66 through the medium of a crank disc 69 and a crank pin 70 on such disc which rides in a longitudinally-extending slot 71 formed in the pendulum arm 67. As the pin 70 rotates with rotation of the crank disc 69, its slidable engagement with the wall of the slot 71 in the pendulum arm 67 causes such arm to oscillate back and forth with a simple harmonic motion to thereby cause the photocell 32 to oscillate back and forth across the luminous image 33 with a corresponding motion which becomes progressively slower as such photocell enters and leaves the region of such luminous image. The crank pin 70 is secured to the crank disc 69 by screwthreads (not shown) and the disc 69 is provided with a plurality of threaded openings located at different distances away from its center of rotation to enable the crank pin 70 to be secured in any selected one of these openings 74 for varying the stroke of the photocell 32 in accord with the nominal size of the workpiece and of its luminous image 33. Since the pendulum arm 67 is not of infinite length, the crank-arm-action imparted to such arm 67 by rotation of the pin 70 causes such arm and the photocell 32 to move past the luminous image 33 in one direction at a time interval which is different than that required for the return of such photocell past the image. Accordingly, provision is made for rendering the photocell 32 effective only during scanning movement in one direction and blanking off the photocell during each successive reverse scan stroke. The blanking means is in the form of a shutter 76 having a slot 77 therein and is oscillated back and forth longitudinally of the arm 67 to cause such slot 77 to be brought into and out of registry with an aperture 78 in the arm 67, which latter aperture is in constant registry with the photocell 32. The shutter 76 is provided with side legs 80 acting to guide its upper end for reciprocal movement along the pendulum arm 67, which movement is effected by the crank pin 70 passing through an accommodating circular opening in the lower end of the shutter element 76. During movement of the pendulum arm 67 in one direction by rotation of the crank disc 69, the shutter element 76 will blank the image to the photocell 32, while the movement of such arm in the opposite direction, as during movement of the crank pin 70 toward bottom dead center position, will bring the elongated slot-like aperture 77 in shutter 76 into registry with the aperture 78 to expose the photocell 32 to the luminous image 33.

The pivot pin 68 is associated with a vertically-adjustable mounting bracket assemblage 80 which is affiliated with such as a portion of the housing 1 of the floating-zone melting equipment. The synchronous motor 66 is mounted at a fixed location relative to the housing 1 by a bracket means 81. A tension spring 82 interposed between such as a fixed portion of the housing 1 and the arm 67 is provided for maintaining any slack between the crank pin 70 and the slot 71 gathered to assure smooth and precise actuation of such arm 67 and photocell 32.

Referring to FIG. 1, during each successive scanning movement of the photocell 32 in one direction across the luminous molten zone image 33, the rise and fall time of the signal pulse from the photocell 32, i.e. the time length of the pulse output from the photocell 32 which is representative of the width of the image 33, is fed to a stretch-squeeze motor control circuit means 90 which compares the time length of such pulse with a reference time to control operation of the stretch-squeeze motor 17 in one direction or the other according to error signal information resulting from such comparison, within certain tolerance limits. The stretch-squeeze motor control circuit means 90, for sake of illustration may be as shown and described in an instruction book I.B. 5771G5, published by Westinghouse Electric Corporation, Industrial Electronics Division, November, 1962. Since such circuit means 90, per se, forms no part of the present invention, a detailed description is not included herein.

Figure 5:
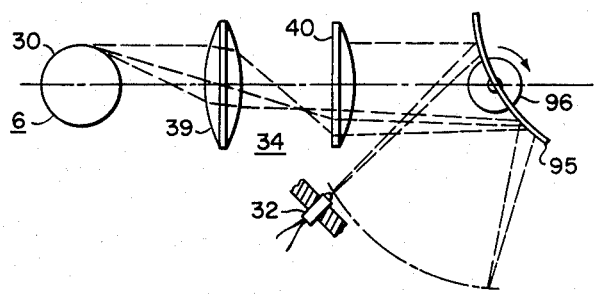
FIG. 5 is a plan view of another embodiment of the invention.

In actual operation, an automatic diameter control apparatus constructed in accord with the showing in FIGS. 1, 2, and 3, with the synchronous motor 66 operating at 100 revolutions per minute, and with a particular type of photocell, consistency of the scanning time was measured to be within .1%, with the tolerance band adjustable down to .7 milliseconds to provide a diameter control accuracy close to plus or minus four thousandths of an inch on a 1⅛ inch wide image representative of a workpiece diameter of 11/16 of an inch.

Where the workpiece 6 may be of refractory metals, or of tungsten, for example, which emit a higher intensity of radiation when in the molten state, effective photocell scanning may be obtained in a simplified manner such as is illustrated in FIG. 5, where the photocell 32 may remain stationary. The luminous image from the optic system 34 is made to periodically scan such photocell through the medium of a rotating convex mirror 95 operated by a synchronous motor 96. The convex shape of the mirror 95 provides for further magnification of the image as seen by the photocell 32. By this arrangement, the photocell 32 is offset with respect to the axis of the lens system, and this may be of advantage in certain space availability installation situations.

Having now described the invention what we claim as new and desire to secure by Letters Patent is:

1. In an equipment comprising means for producing a narrow molten longitudinal zone in an elongated rod-like material and advancing such zone along the length thereof, and molten-zone-diameter regulating means, the combination therewith of optical means in observance of said molten zone for producing a luminous image of the same, photocell means, means for effecting scanning of said luminous image by said photocell means in the molten-zone-diameter-representative direction repetitively at a certain scan duration time to produce electrical pulses each of a length representative of the molten zone diameter at successive intervals during its aforesaid advancing along the rod-like material, and means for comparing the length of each of such pulses with a reference length and controlling said regulating means accordingly to maintain the diameter of said molten zone within close tolerance limits.

2. Apparatus comprising a photocell to produce successive electrical pulses each to have a length representative of a dimension of an object, means producing a radiation-contrasted image of such object including its dimension of interest, and photocell actuating means for effecting repeated scanning movement of said photocell past said image in the direction of such dimension at a varying rate which is slow adjacent to the opposite scanned ends of the image relative to the travel rate at the midpoint of the image, thereby to enhance the response of the photocell at entry and exit of the image while minimizing time required for each scan, thereby assuring a substantially square shape to the ends of the aforesaid pulses.

3. Apparatus as set forth in claim 2, wherein said photocell actuating means comprises an arm rockable about a pivot point at one end and carrying said photocell at a point remote from said pivot point, a rotating crank member having an operative connection with said arm, and a synchronous motor operatively connected to said crank motor, whereby the aforesaid scanning movement of said photocell has a simple harmonic motion characteristic.

4. Apparatus as set forth in claim 3, wherein said crank member is in form of a disc and said operative connection is in form of a pin removably mounted in one of a plurality of openings located at different radii from the rotary axis of said disc.

5. Apparatus as set forth in claim 3, further including shutter means operative to permit observance of said image by said photocell only during movement of said arm in one direction while obscuring such observance during each movement of the arm in the return direction.

References Cited by the Examiner

UNITED STATES PATENTS

| | | | |
|---|---|---|---|
| 2,434,924 | 1/1948 | Hamilton | 250—238 |
| 2,438,160 | 3/1948 | Green | 250—215 X |
| 2,484,323 | 10/1949 | Sweet | 250—239 |
| 2,674,915 | 4/1954 | Anderson. | |
| 2,899,564 | 8/1959 | Rabinow et al. | 250—235 |
| 2,916,593 | 12/1959 | Herrick | 219—10.43 X |
| 2,958,802 | 11/1960 | Hammar et al. | 250—235 X |
| 3,046,379 | 7/1962 | Keller et al. | 219—10.34 X |

RALPH G. NILSON, *Primary Examiner.*

WALTER STOLWEIN, *Examiner.*